No. 802,905. PATENTED OCT. 24, 1905.
G. A. BOBRICK.
TIRE INFLATING MEANS.
APPLICATION FILED MAY 31, 1904.
2 SHEETS—SHEET 1.
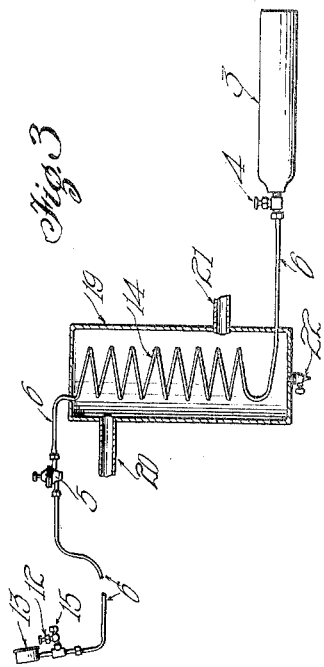
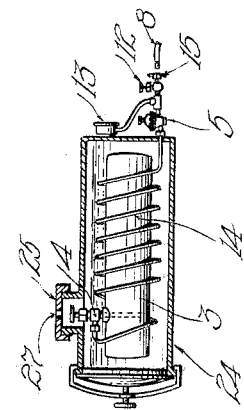
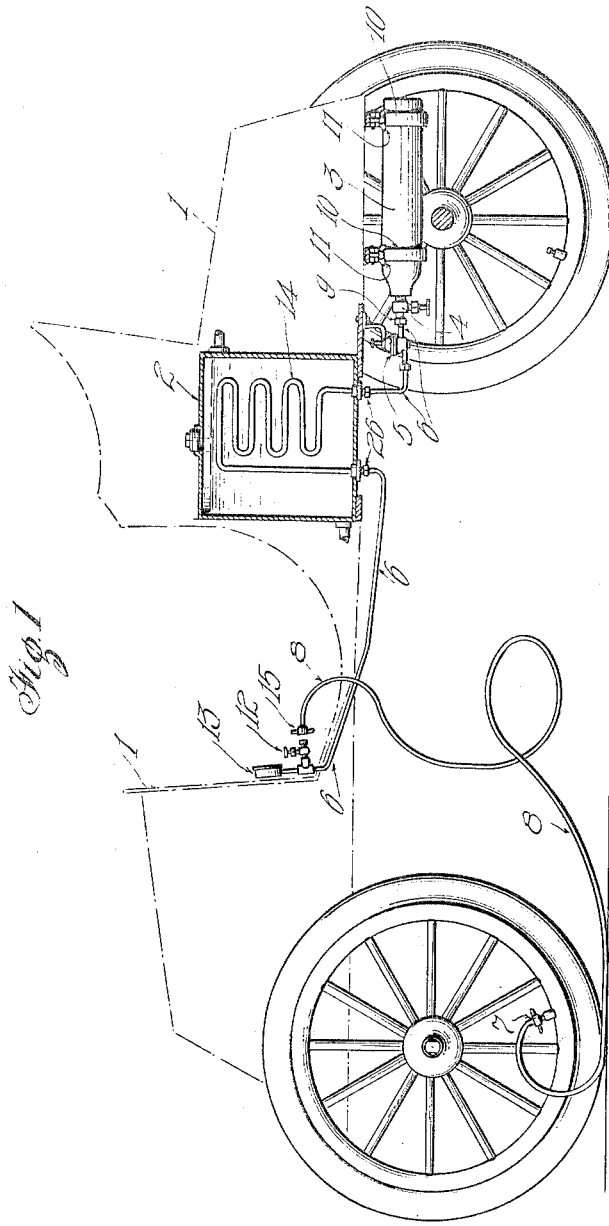
Witnesses
J. Mansfield
A. P. Knight
Inventor
Gabriel A. Bobrick
by Townsend Bros.
Attys.

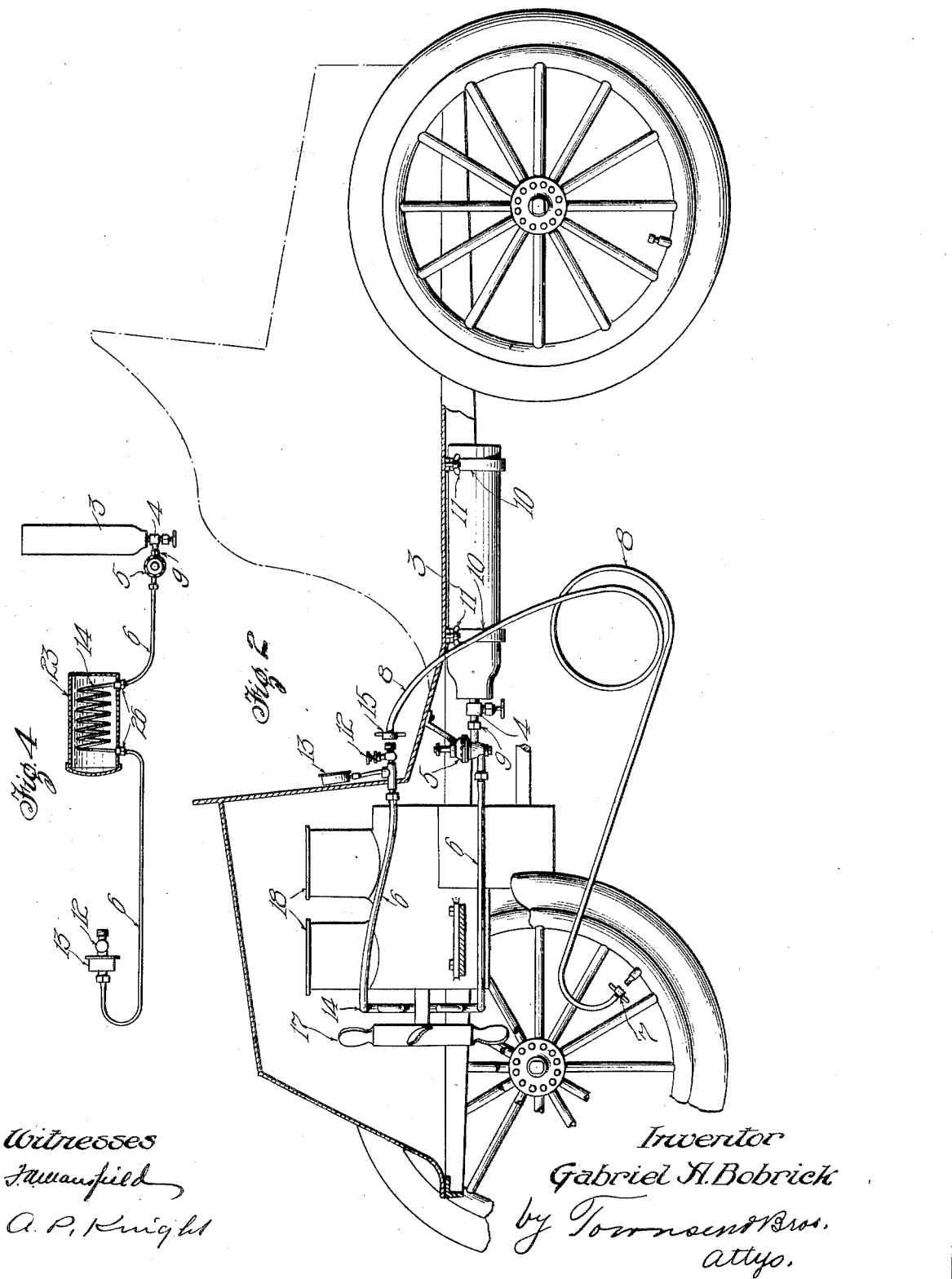

UNITED STATES PATENT OFFICE.

GABRIEL A. BOBRICK, OF LOS ANGELES, CALIFORNIA.

TIRE-INFLATING MEANS.

No. 802,905.   Specification of Letters Patent.   Patented Oct. 24, 1905.

Application filed May 31, 1904. Serial No. 210,336.

*To all whom it may concern:*

Be it known that I, GABRIEL A. BOBRICK, a citizen of the United States, residing at Los Angeles, in the county of Los Angeles and State of California, have invented new and useful Improvements in Tire-Inflating Means, of which the following is a specification.

The primary object of this invention is to provide means for conveniently and expeditiously inflating the tires of automobiles and the like.

A further object of the invention is to do away with the necessity of using pumps or similar appliances on the automobile or vehicle for inflating the tires.

Another object of the invention is to inflate the tires in such manner that they will not have to be inflated so often as is now customary.

Another object of the invention is to prevent to a large extent deterioration of the rubber tires by the action of the compressed air and moisture carried into the tire during inflation.

According to my invention the tires are inflated with carbon-dioxid gas which, owing to its greater density and its lack of affinity for caoutchouc, does not leak through the tire so rapidly as atmospheric air would. The use of air is open to the objection that in course of time the rubber becomes hardened by the action of the air, whereas with carbon dioxid no such effect occurs and the rubber is preserved, being protected from the action of the air by the carbon dioxid which fills its pores. The carbon dioxid will be stored at high pressure, and on its release it will exert a powerful refrigerating effect by its expansion.

A further object of my invention is to avoid any difficulty as to clogging of the valves due to such refrigeration and also avoid the possibility of the rubber tubing used in making connections being rendered brittle by extreme cold.

The invention comprises means for the storage and transportation of carbon dioxid, preferably in liquid form, means for delivery of the carbon-dioxid or carbonic-acid gas at proper pressure to the tires, and means for warming the gas to prevent clogging of the communications by refrigeration in expansion.

The accompanying drawings illustrate the invention.

Figure 1 is a side elevation of a form of my invention applied in connection with the water-tank of an automobile driven by an internal-combustion or steam engine, the parts not directly associated with my invention being represented in broken lines. Fig. 2 is a similar view showing the invention applied to an automobile driven by an air-cooled internal-combustion engine. Fig. 3 is a side elevation of a form of my invention adapted for steam-automobiles. Fig. 4 is a plan of a form of the apparatus suitable for automobiles, such as electric automobiles, having no water-tank or circulating system and no exhaust-muffler. Fig. 5 is a side elevation of a portable tire-inflating apparatus embodying my invention.

Referring to Fig. 1, the body of an automobile is indicated at 1 in broken lines, 2 designating the tank for the circulating cooling-water of the propelling internal-combustion engine. (Not shown.)

A tank, reservoir, or receptacle 3 is suitably supported on the automobile and is connected, through a hand-valve 4, a reducing-valve 5, and a pipe or conduit 6, with a nozzle or coupling 7, adapted for insertion or coupling into the tire-valve of any one of the automobile-wheels. To enable such coupling, an extension or part 8 of such conduit is made flexible, being, for example, a rubber hose of sufficient length to reach any one of the wheels.

A union or detachable coupling 9 is desirably provided between the tank 3 and the pipe connection on the vehicle, preferably between the cut-off valve 4 and the reducing-valve 5, and the tank itself is made detachable from the vehicle, being supported by yokes or clamps 10, which may be loosened by the fastening devices or nuts 11 to allow the tank to be removed therefrom.

A throttle-valve 12 is connected in the conduit aforesaid and is located in position for convenient access by the chauffeur, for example, in front of the seat or back of the hood. A detachable coupling or union 15 is provided for this valve and the flexible tubing 8, so that when said tubing is not in use it may, if desired, be uncoupled and placed in another part of the vehicle.

A pressure-gage 13 is connected to pipe 6, preferably between throttle 12 and the reducing-valve 5, and is located in position for convenient inspection. The reducing-valve should be set to maintain the proper pressure, as shown by this gage. The carbon dioxid issuing through this reducing-valve, owing to the release of pressure, would drop in temperature to such an extent as to freeze and render brittle the flexible rubber pipe leading to the tires and also to partly solidify and clog the fine needle-valves. To obviate this, a part 14 of the conduit is formed as a heating or warming portion, being, for example, a coil immersed in the water-tank 2 of the automobile above referred to. The expanding gas will absorb heat from the water, thereby not only preventing undue cooling of the gas, but aiding in cooling the water. Couplings or unions 26 are provided connecting this coil portion 14 to the pipe 6 to facilitate assembling the parts.

In case the automobile is not provided with a water-cooler, but with a fan, as in what is commonly known as "air-cooled internal-combustion engines," as indicated at 17 in Fig. 2, the warming-coil 14 for the carbon-dioxid gas may be arranged between the blower and the engine 18, as therein shown, the other parts being the same as in Fig. 1.

In applying my invention to a steam-automobile the warming-coil 14 may be inserted either in the water-tank or in the path of the exhaust-steam from the engine, being, for example, as shown in Fig. 3, inclosed in the muffler-casing 19, having an inlet 20, leading from the exhaust of the engine, (not shown,) and an outlet 21, a drip-trap or drainage-valve 22 being provided at the bottom of the casing, or the connections for a steam-automobile may be as in Fig. 1, wherein the tank 2 may be the water-tank.

When the automobile is not provided with any cooling means—for example, in the case of an electric automobile—then special means for warming the carbon-dioxid gas may be provided. For example, as shown in Fig. 4, a water-tank 23 may be provided, through which the warming-coil 14 is passed.

In some cases it will be desirable to make the apparatus portable, so that it can be placed on or taken off of any automobile. A convenient form for this purpose is shown in Fig. 5, wherein the tank 3, cut-off valve 4, and warming-coil 14 are all inclosed in a suitable vessel 24, the top or cover 25 of this vessel being made removable for inspection of the parts. Said vessel or tank may be filled with water.

The reducing-valve 5, throttle-valve 12, and pressure-gage 13 are located at the outside of the box for convenient inspection at all times. A coupling 15 is provided for connecting the flexible tubing 8 with the end of the pipe leading from the warming-coil and throttle-valve.

27 is a vent.

In using the device the cylinder or reservoir 3 is charged with carbon dioxid, preferably in liquid form, and the charged cylinder will be inserted in place in the supports 10 and connected to the tubing 8 by means of the union 9. Valve 4 is then opened to allow the gas to pass through the reducing-valve 5 and the warming-coil 14 to the throttle 12, the latter being generally closed and the reducing-valve being adjusted so that it will automatically regulate the flow of gas to a pressure suitable for inflating tires. When any tire needs inflation, the flexible tubing 8 is connected with the throttle-outlet, and at its other end it is connected with the tire of the wheel in the usual manner of such devices. The throttle being then opened, gas under pressure is allowed to flow into the tire until it is properly inflated and the throttle is then closed, the flexible tubing being then either removed or coiled out of the way.

One pound of liquid carbon dioxid will furnish about eight cubic feet of gas at 32° Fahrenheit. The density of $CO_2$ gas as compared with air is about 1.52, or half again as dense as air, and therefore, according to the law of effusion, its liability to leak out through the pores and small punctures in the rubber will be less than with air. Furthermore, the carbon dioxid being a non-oxidizing gas will preserve the rubber, or at least will be without deteriorating effect thereon in contrast to air, which exerts a constant oxidizing and hardening effect upon the rubber, especially when the air contains moisture. The average automobile-tire has a capacity of about one cubic foot of free air at a pressure of about sixty pounds to the square inch. A gallon of liquid $CO_2$ will therefore completely inflate about sixty tires to the proper pressure. This will require a cylinder of about three and one-half inches diameter by twenty-four inches long, inside measurements. The cylinder may be made of cold-drawn steel, and owing to the small diameter the metal will only have to be slightly over one-eighth inch thick. It will therefore be seen that the weight and space taken up by the device are not such as to materially affect the weight of the vehicle or to be cumbersome. Liquid $CO_2$ costing about ten cents per pound, the cost of inflating tires is negligible as compared to the advantages and the saving of labor. One gallon cylinder of $CO_2$ if properly used will last about one year.

What I claim is—

1. Means for inflating tires comprising a tank for holding gas under pressure, a valve connected thereto, a reducing-valve, a flexible tube and a coupling adapted to detachably connect with the valve of the tire and a valve between the reducing-valve and the tire-valve.

2. Means for inflating tires comprising a tank for containing liquid carbon dioxid, a reducing-valve connected thereto, a warming means connected with said valve, and a flexible connection therefrom having a detachable coupling for establishing communication from the valve to a tire.

3. Means for inflating tires, comprising a tank for containing liquid carbon dioxid, a reducing-valve connected with said tank, a warming means connected to said valve, a throttle connected to said warming means, and a flexible tube connected to said throttle.

4. Means for inflating tires, comprising a tank for containing liquid carbon dioxid, a reducing-valve connected with said tank, a warming means connected to said valve, a throttle connected to said warming means, and a flexible tube detachably connected to said throttle.

5. Tire-inflating means for automobiles, comprising supporting means, a liquid-carbon-dioxid receptacle removably mounted in said supporting means, a pipe on the automobile having a tire-supplying connection and a detachable coupling between the receptacle and said pipe.

6. In an automobile having a propelling means and heat-dissipating means therefor, a tire-inflating means comprising a receptacle for liquid carbon dioxid, a valve connected to said receptacle, a conduit from said valve having a part located in position to receive heat from the heat-dissipating means and a flexible connection from said conduit having a detachable coupling for connection with a tire.

7. In an automobile having a propelling means and heat-dissipating means therefor, including a water-tank, a tire-inflating means comprising a receptacle for liquid carbon dioxid, a valve connected to said receptacle, and a connection from said valve having a part located in said water-tank to receive heat from the heat-dissipating means.

8. In an automobile, driven by a gas-engine and provided with a water-cooler for the gas-engine, a tire-inflating means comprising a receptacle for liquid carbon dioxid, a valve connected to said receptacle, and a connection from said valve having a part located in said water-cooler.

9. Means for inflating tires comprising a tank for holding gas under pressure, a valve connected thereto, a reducing-valve detachably connected to said valve, a flexible tube having a coupling adapted to detachably connect with the valve of the tire, and a connection between said tube and the reducing-valve.

10. Means for inflating tires comprising a tank for holding gas under pressure, a valve connected thereto, a reducing-valve detachably connected to said valve, a flexible tube having a coupling adapted to detachably connect with the valve of the tire and a valve between the reducing-valve and the tire-valve.

11. Means for inflating tires comprising a tank for holding gas under pressure, a valve connected thereto, a flexible tube and a coupling adapted to detachably connect with the valve of the tire, and a pressure-gage between the valve of the tank and the tire-valve to indicate the pressure at which the tire is to be inflated.

12. Means for inflating tires comprising a tank for holding gas under pressure, a valve connected thereto, a reducing-valve, a tube and a coupling adapted to detachably connect with the valve of the tire and a pressure-gage between the reducing-valve and the tire-valve.

13. Tire-inflating means for automobiles, comprising supporting means, a receptacle for holding gas under pressure, detachably mounted on said supporting means, a valve connected to said tank, a flexible tube and a coupling adapted to detachably connect with the valve of the tire and a pressure-gage between the valve of the tank and the tire-valve.

In testimony whereof I have signed my name to this specification, in the presence of two subscribing witnesses, at Los Angeles, in the county of Los Angeles and State of California, this 23d day of May, 1904.

GABRIEL A. BOBRICK.

In presence of—
ARTHUR P. KNIGHT,
JULIA TOWNSEND.